Nov. 7, 1961   R. F. BECKER   3,007,653
PRE-LOAD CONTROL FOR A COIL SPRING
Filed Aug. 4, 1958
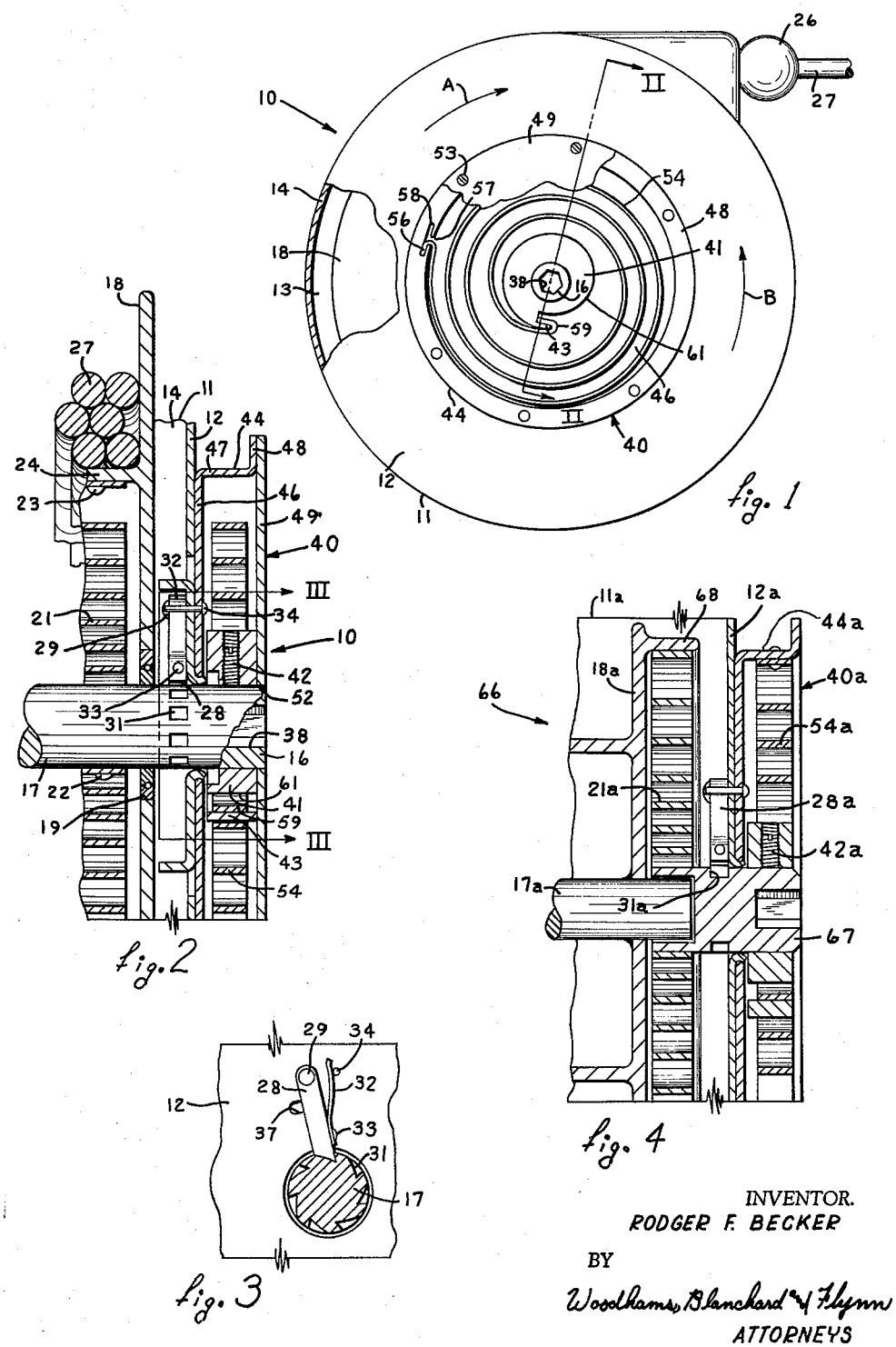
INVENTOR.
RODGER F. BECKER
BY
Woodhams, Blanchard & Flynn
ATTORNEYS

United States Patent Office 3,007,653
Patented Nov. 7, 1961

3,007,653
PRE-LOAD CONTROL FOR A COIL SPRING
Rodger F. Becker, Kalamazoo, Mich., assignor to Aeromotive Manufacturing Company, Kalamazoo, Mich., a corporation of Michigan
Filed Aug. 4, 1958, Ser. No. 752,906
6 Claims. (Cl. 242—107.5)

This invention relates in general to a device for controlling the pre-load applied to a coil spring and, more particularly, to a type of such device which is adaptable to a cord reel for positively preventing the pre-loading of the reel spring from diminishing the extendability of the cord from the cord reel.

It is common practice to pre-load coil springs, such as those used to effect automatic rewinding of a cord reel, so that the means connected to the coil spring will be urged in a selected direction at all times. However, in such cases, the spring often tends to fatigue with use and, as a result, often fails to rewind the cord completely upon the reel. Thus, even though the coil spring in the cord reel is pre-loaded, it may eventually become so fatigued from use that the effects of the pre-loading are seriously diminished. To meet this problem, it has long been common to mount the shaft of the cord reel within the cord reel housing so that it can be rotated in a direction to effect further pre-loading of the coil spring as desired. However, in many such cases the pre-loading of the spring has been carried to such an extent by the user thereof that the spring becomes fully tightened upon the shaft before the cord is fully extended and its use is thus impaired. Heretofore, no provision has been made for indicating when further pre-loading of the coil spring will result in reducing the extent to which the cord can be unwound from the cord reel or for limiting such pre-loading.

Accordingly, a primary object of this invention has been the provision of a device for accurately controlling the extent to which a coil spring can be pre-loaded.

A further object of this invention has been the provision of a pre-load control for a coil spring, as aforesaid, wherein pre-loading of said coil spring will not exceed a predetermined point, namely and usually, the point where it will interfere with the complete unwinding of the cord from the cord reel.

A further object of the invention has been the provision of a pre-load control, as aforesaid, which is simple to set, which is completely automatic in its operation, which can be adapted to use with any conventional type of cord reel structure presently known to exist wherein a coil spring is utilized for the purpose of effecting a rewinding of the cord upon the cord reel and wherein said control can be easily and inexpensively fabricated.

A further object of this invention has been the provision of a pre-load control, as aforesaid, which is positive in its operation, which requires no maintenance, which is sturdy and reliable in construction and which requires no instruction to use since it responds automatically to the operation of the mechanism provided for effecting the pre-loading of the spring.

Other objects and purposes of this invention will be apparent to persons familiar with this type of equipment upon reading the following specification and examining the accompanying drawings, in which:

FIGURE 1 is a broken side elevational view of a cord reel housing upon which the pre-load control of the invention is installed.

FIGURE 2 is a sectional view taken along a line II—II of FIGURE 1.

FIGURE 3 is a sectional view taken along a line III—III of FIGURE 2.

FIGURE 4 is a fragmentary, central cross sectional view of a modified cord reel structure embodying the invention.

General description

The objects and purposes of the invention, including those set forth above, have been met by providing a cord reel assembly comprising a cord supporting reel rotatably supported upon a shaft mounted within a reel housing having an opening in its periphery through which the reel cord is extendable. The reel is urged in a cord winding direction with respect to its supporting shaft by a coil spring disposed and connected between said shaft and said reel. A stop mechanism, which may comprise a pawl and ratchet, is mounted between said housing and shaft to permit unidirectional rotating of the shaft with respect to the housing in a direction effecting a loading of said coil spring. An elongated element, which is a coil spring in this particular embodiment, encircles the shaft and is connected at its inner end thereto, the outer end of said element being fixed with respect to said reel housing, so that said element will become wound or wrapped around said shaft as said shaft rotates with respect to the reel housing. The element is of such length that it permits only a limited and predeterminable amount of rotation of said shaft in said loading direction with respect to said housing before it becomes fully wrapped around the shaft, thereby positively limiting the amount of pre-loading which may be applied to said coil spring by rotation of the shaft with respect to the reel housing.

For the purpose of convenience in description, the terms "inner," "outer" and derivatives thereof will have reference to the geometric center of the cord reel assembly and parts thereof including said pre-load control.

Detailed construction

For convenience in illustrating the invention, attention will first be directed to certain details of construction of typical apparatus of the prior art giving rise to the problem above discussed and to which an illustrative embodiment subsequently described is applied. The prior art apparatus so illustrated and described will be understood as selected solely for illustrative purposes and its selection herein does not imply any limitation on the use of the invention with other types of apparatus where applicable.

The cord reel assembly 10 (FIGURES 1 and 2) is comprised of a substantially cylindrical housing 11 having a pair of spaced circular and coaxial side sheets 12 and 13 and a peripheral sheet 14, which is secured to and extends between the edges of said side sheets. A shaft 17 is coaxially supported upon and between the side sheets 12 and 13, and one end 16 of said shaft extends through and beyond said side sheet 12. A cord reel 18 is rotatably supported upon the shaft 17 by any convenient means, such as the bearing 19. A coil spring 21 encircles the shaft 17 and is connected at its inner end by means, such as the rivet 22, to the shaft 17. The outer end of the coil spring 21 is secured by means as desired, such as a rivet 23, to the central drum 24 of the cord reel 18.

A cord 27 (FIGURE 2), which may be an insulated electrical conductor, is wound upon the drum 24 of the cord reel 18. Where the cord 27 is an electrical conductor, it may be arranged for connection to a source of electrical energy in a manner as set forth in Patent Number 2,640,113. The arrow A in FIGURE 1 indicates the direction in which the reel 18 is rotated with respect to the housing 11 for the purpose of unwinding the cord 27 from the reel 18 and thereby imposing an increased load upon the reel spring 21. The arrow B in FIGURE 1 indicates the direction in which the reel 18 is rotated by the spring 21 to rewind the cord 27, whereby the tension on the spring 21 is reduced.

A pawl 28 (FIGURE 2) is pivotally supported near one end upon the inner side of the side sheet 12 by means of the pin 29 so that the other end of the pawl 28 is engageable with one of the notches 31 at a time in the shaft 17. Said notches 31 are arranged uniformly around said shaft 17 and shaped so that when one of them is engaged by said pawl 28 the shaft 17 is positively prevented as a result of such engagement from rotating in direction A (FIGURE 1) with respect to the housing 11. As shown in FIGURE 3, a leaf spring 32 is secured as desired, such as by the rivet 33, to that side of the pawl 28 facing generally away from the shaft 17. Said spring is engageable with a pin 34 secured to and extending inwardly from the inner surface of the side sheet 12 whereby said pawl is resiliently and continuously urged into engagement with the periphery of the shaft 17, thereby preventing accidental disengagement of the pawl 28 from any one of the notches 31 into which it is received.

As shown in FIGURE 3, the side sheet 12 is provided with an opening 37 through which the pawl 28 can be seen and engaged for the purpose of disengaging it from within any one of the notches 31, thereby permitting rotation of the shaft 17 in direction A (FIGURE 1). The end 16 of the shaft 17 protruding through the side sheet 12 has a socket 38 engageable by means, such as an Allen wrench (not shown), whereby rotation of the shaft 17 can be effected in direction B. Rotation of the shaft 17 in direction A can be effected or controlled by said wrench after the pawl 28 has been released from the shaft 17. Because of the arrangement of the reel spring 21 in this particular embodiment, rotation of the shaft 17 in direction B (FIGURE 1) will effect a pre-loading upon the spring 21. Conversely, rotation of the shaft 17, when permitted by a release of the pawl 28 therefrom, in direction A, effects an unloading of the spring 21.

The outer free end of the cord 27 may be connected to any suitable device, such as an extension lamp (not shown), in a conventional manner. A stop 26, which may be in the form of a solid sphere fabricated from a resilient material such as rubber, has an opening therethrough for receiving the cord 27. The stop 26 serves to protect the connection between the cord 27 and the object at its free end in a substantially conventional manner during the winding operation.

With the foregoing description in mind of apparatus of the prior art giving rise to the problem above described and which is solved by the present invention, attention is now directed to one typical embodiment of the invention. In this embodiment, the control device 40 (FIGURE 1) includes a substantially circular collar 41 mounted upon the outer end 16 of the shaft 17 and held against rotation with respect to the shaft 17 by a set screw 42 (FIGURE 2). The collar 41 (FIGURE 1) has a circumferentially extending hook 43 which opens in the direction of rotation indicated by the arrow B. The device 40 also includes a cup-shaped housing 44 (FIGURE 2) having a substantially circular side wall 46 which is concentric with the circular side sheet 12 and is secured to the exterior surface of said sheet 12 by means, such as welding. The control housing 44 also has a circumferential wall 47 having a radially outwardly extending annular flange 48 remote from the side wall 46. A preferably annular side plate 49 is held by screws 53 against the annular flange 48 and concentric therewith. The outer end 16 of the shaft 17 may extend through the opening 52 in said side plate 49 so that it is substantially flush with the outer surface of said side plate 49. Thus, the Allen wrench socket 38 is easily accessible when the side plate 49 is mounted upon the annular flange 48.

An elongated and flexible element, such as the coil spring 54, encircles the collar 41 and is rigidly secured at its outer end to the circumferential wall 47. In this particular embodiment, the outer end of the spring 54 has a hook 56 which is received through a slot 57 in the circumferential wall 47 and may be secured, if desired, to said circumferential wall 47 by welding, brazing or the like. The flange 48 may be relieved at 58 to permit sideward sliding of the hook 56 into the slot 57 during assembly. The inner end of the control spring 54 is folded inwardly and then back upon itself to provide the hook 59 which is slidably engageable with the hook 43 on the collar 41. Since the hooks 56 and 59 open in opposite directions, their disengagement from the flange 48 and hook 43 on the collar 41, respectively, is positively prevented as long as there is a load on the spring 54. Because of the substantially involute shape of the surface 61 on the collar 41 leading away from the hook 43 in the rotational direction B (FIGURE 1) disengagement between the hook 56 on the spring 54 and the hook 43 on the collar 41 is automatically effected when the collar 41, hence the shaft 17, is rotated in direction A with respect to the housing 11 beyond the point where the load is completely removed from the control spring 54.

It will be recognized that the coil spring 54 has been selected, because of its convenient structure, to illustrate the type of control element contemplated by the invention. However, at least some of the objects of the invention can be accomplished by using any elongated strip of flexible and sufficiently strong material, such as a chain, and connecting same at one end to the circumferential wall 47 and at the other end to the collar 41. In fact, under some circumstances the inner end of such strip could be fastened directly to the outer end 16 of the shaft 17. In such case, the strip might be partially wound upon the shaft 17 in either direction, depending upon the amount of control desired in the pre-loading operation.

Operation

The operation of the cord reel assembly 10, whereby the cord reel 18 is continuously urged by the spring 21 to wind the cord 27 upon the drum 24, may be and preferably is substantially conventional. That is, as the cord 27 is pulled away from and out of the housing 11, the cord reel 18 is rotated in direction A (FIGURE 1) with respect to the housing 11 thereby imposing an increasing load upon the reel spring 21. Accordingly, when the cord 27 is released, and the holding mechanism associated therewith is disengaged, the reel spring 21 will rotate the cord reel 18 in direction B, thereby causing the cord 27 to be rewound upon the reel 18. Under normal conditions and according to existing practices it is customary to pre-load the coil spring 21 so that complete rewinding of the cord 27 upon the reel 18 is assured. This is usually and conventionally accomplished by rotating the shaft 17 in direction B with respect to its supporting means, such as the housing 11 in this embodiment, while the reel 18 is held non-rotatable with respect to such housing. The shaft 17 then is locked in its new position with respect to the reel by the pawl 28 and notches 31.

The control device 40 (FIGURE 1) characterising the invention is assembled and adjusted so that it will permit a selected amount of pre-loading of the coil spring 21. This is accomplished by placing the collar 41 upon the outer end 16 of the shaft 17 and causing its hook 43 on said collar to engage the inner hook 59 on the spring 54. Said collar 41 is then rigidly fixed with respect to the shaft 17 by means of the set screw 42 at an appropriate point in the rotation of shaft 17 with respect to the reel depending upon the amount of pre-loading which it is desirable to permit. More specifically, the collar 41 can be fixed upon the shaft 17 before the initial pre-loading of the coil spring 21, in which case such initial pre-loading will use up a portion of the total amount of pre-loading permitted by the control device 40. On the other hand, the collar 41 may be fixed with respect to the shaft 17 after the initial pre-loading of the coil spring 21 is effected, thereby making available the entire capacity of the control device 40 for additional and later loading or pre-loading of the spring 21. Obviously, the collar 41 may also be secured to the shaft 17 while the initial pre-loading is only partially complete. Regardless of the exact point at which the collar 41 is secured to the shaft 17, the basic result is the same and the only difference resides in the amount of pre-loading available. As additional pre-loading is placed upon the reel spring 21, the control spring 54 continues to tighten upon the collar 41 until a condition is reached wherein further relative rotation between the collar 41 and the control housing 44, hence the reel housing 11, is positively prevented by the coil spring 54. At such time, the cord 27 will still be fully extendable, if such was intended by the original setting of the collar 41.

If at any time during the use of the cord reel assembly 10 it becomes desirable to release all of the loading upon the control spring 21, this is easily accomplished by placing an Allen wrench, for example, into the socket 38 in the shaft 17 and rotating the shaft 17 in the pre-loading direction indicated by arrow A (FIGURE 1) a short distance. A rod or the like is then inserted into the opening 37 through the sidewalls of the control housing 44 and reel housing 11 after which said rod is moved rightwardly as appearing in FIGURE 3. This forces the pawl 28 away from the shaft 17 against the contrary urging by the spring 32. If the shaft 17 is now released, the reel spring 21 as well as the control spring 54 will cause it to rotate in direction A of FIGURE 1 until the coil spring 21 is completely unloaded. If, during this unloading, the reel spring 21 causes the shaft 17 to rotate in the unloading direction a greater number of times than necessary to remove the tension on the control spring 54, the hook 59 on the inner end of the control spring 54 will become disengaged from the hook 43 on the collar 41 and permit the shaft 17 and collar 41 to rotate within the control spring 54 without doing any harm whatsoever to the control device. On the other hand, if the tension is removed from the reel spring 21 during said unloading operation before the control spring 54 unwinds, then the tension on the spring 54 can be released by sliding its inner end off of the hook 43 on the collar 41. The control device 40 can again be used in the manner set forth above for the purpose of controlling the pre-load on the reel spring 21.

Where a less rigid element than the control spring 54 is used in the control device 40, such element can be secured to the collar 41 or even directly to the shaft 17. In this case any excess rotation of the shaft 17 produced by the reel spring 21 during an unloading operation thereof, would simply cause the element to wrap around the collar 41 or shaft 17 in the reverse direction.

*Alternate construction*

The fragment of a cord reel assembly 66 disclosed in FIGURE 4 illustrates an alternate construction wherein the cord reel 18a is rigidly secured to a shaft 17a, one end of which is rotatably supported upon a stub shaft 67 which extends through the side sheet 12a of the housing 11a. The reel spring 21a encircles the inner end of the stub shaft 67 and is secured at its inner end thereto. The outer end of the reel spring 21a is secured to an annular flange 68 extending from and coaxial with the side of the cord reel 18a adjacent to the side sheet 12a. A pawl 28a is mounted upon the interior surface of the side sheet 12a for cooperation with notches 31a in the stub shaft 67 in a manner substantially the same as set forth above with respect to the pawl 28 and notches 31 in FIGURE 2. The control device 40a, including the collar 41a, the control housing 44a and the control spring 54a, may be substantially the same as the control device 40 shown in FIGURES 1 and 2, and described above.

The operation of the alternate cord reel assembly 66 is substantially the same as the operation of the cord reel assembly 10. The principal differences between these two assemblies reside in the specific details of their cord reel and shaft constructions.

Although particular preferred embodiments of the invention have been disclosed above in detail for illustrative purposes, it will be understood that variations or modifications of such disclosure, which do not depart from the scope of the appended claims, are fully contemplated.

What is claimed is:

1. A pre-load control for a coil spring of a cord reel, comprising: a shaft; a coil spring encircling and secured at its inner end to said shaft; a cord reel rotatably supported upon and coaxial with said shaft and secured to the outer end of said spring; a shaft support and cooperating means connected to said reel and said shaft support for limiting rotation of said cord reel around the axis of said shaft in one direction; stop mechanism including a pawl mounted upon said shaft support and releasably engageable with said shaft for preventing rotation of said shaft in the other direction around said axis; an elongated element secured at one end to said shaft and at the other end being fixed with respect to said support, said element being wound upon said shaft in response to rotation of said shaft with respect to said support and without rotating said reel, the relative positions of said inner and outer ends of said element remaining fixed during the normal rotation of said reel around and with respect to said shaft.

2. The structure of claim 1 wherein said shaft support is part of a housing rotatably supporting said shaft and said cooperating means includes a cord wound upon said reel; and wherein said stop mechanism includes ratchet means on said shaft engageable by said pawl for selectively preventing rotation of said shaft around said axis in said other direction.

3. The structure of claim 1 wherein said cooperating means includes a cord wound upon said reel; wherein said elongated element is releasably secured to said shaft; and wherein said element can be fully wound upon said shaft in response to rotation of said shaft with respect to said support in said one direction without reducing the extendability of said cord from said reel.

4. A pre-load for the coil spring of a cord reel, comprising: a shaft; a cord reel rotatably supported upon said shaft; a coil spring encircling said shaft and secured thereto at its inner end, the outer end of said spring being secured to said reel; a shaft support; cooperating means connected to said reel and said shaft support for terminating rotation of said reel with respect to said support around the axis of said shaft in one direction; stop mechanism including a pawl pivotally mounted upon said shaft support for releasably engaging said shaft and preventing rotation of said shaft around said axis in the other direction; an elongated, relatively stiff element encircling said shaft, the outer end of said element being fixed with respect to said shaft support, said spring and said element being coiled around said shaft in said other direction; means releasably securing the inner end of said element to said shaft so that said inner end becomes disconnected from said shaft when said shaft is rotated with respect to said support in said other direction beyond a predetermined point, said element being tightened upon said shaft to pre-load said spring in response to rotation of said shaft with respect to said reel and said support in said one direction, and the relative positions of said inner and outer ends of said element remaining fixed with respect to each other during normal rotation of said reel around and with respect to said shaft.

5. The structure of claim 4 wherein said shaft support includes a housing for said cord reel; and wherein said elongated element is a second coil spring having less than half of the length of the first coil spring, the outer end of said second spring being fixed with respect to said housing and the inner end of said second spring being releasably engageable with said shaft.

6. The structure of claim 4 wherein the means releasably securing the inner end of said second spring to said shaft includes a substantially hook-shaped end portion on said second spring opening substantially in said other direction, said shaft having a cooperating notch opening in said one direction into which said end portion is releasably received.

References Cited in the file of this patent
UNITED STATES PATENTS

| | | |
|---|---|---|
| 1,685,748 | Pederson | Sept. 25, 1928 |
| 2,786,548 | Bristol | Mar. 26, 1957 |